(No Model.)
J. THOMSON.
PROPORTIONAL WATER METER.
No. 476,097. Patented May 31, 1892.
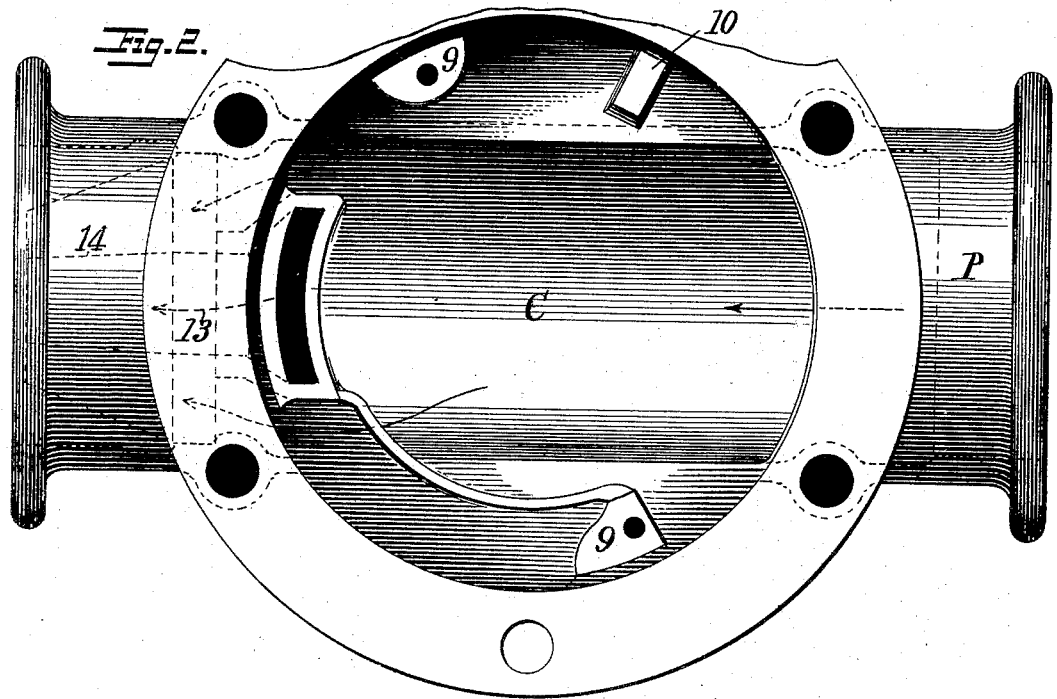
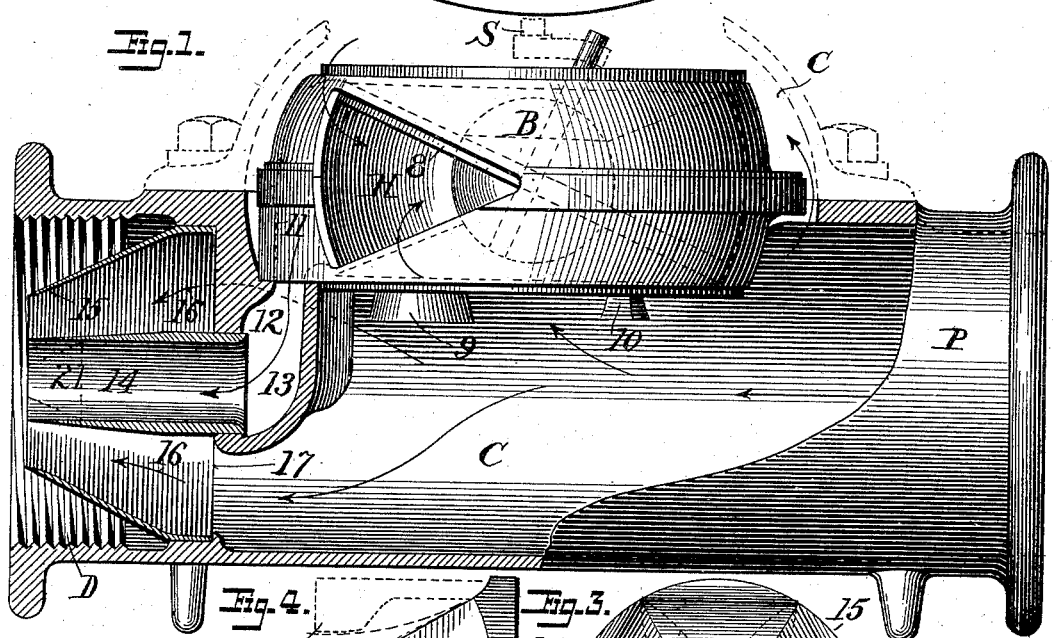
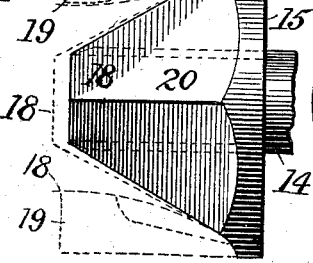
WITNESSES:
INVENTOR:

UNITED STATES PATENT OFFICE.

JOHN THOMSON, OF BROOKLYN, ASSIGNOR TO THE THOMSON METER COMPANY, OF NEW YORK, N. Y.

PROPORTIONAL WATER-METER.

SPECIFICATION forming part of Letters Patent No. 476,097, dated May 31, 1892.

Application filed September 8, 1891. Serial No. 405,104. (No model.)

*To all whom it may concern:*

Be it known that I, JOHN THOMSON, a citizen of the United States, residing in Brooklyn, Kings county, State of New York, have invented certain new and useful Improvements in Proportional Water-Meters, of which the following is a specification.

This is an invention in proportional water-meters, the object of which is to produce a meter of this class without the intervention of operating mechanical appliances other than that of the measuring device employed to determine the aliquot part, by which expedient the whole volume is inferred.

In the drawings, Figure 1 is a part vertical center section and elevation of a meter embodying my invention. Fig. 2 is a top detail plan view of the lower section of the main casing, the measuring device removed. Fig. 3 is a front view, and Fig. 4 a side view, of a modification in the outlet-nozzle.

I have found that if the measuring mechanism of a water-meter of small capacity and slight resistance to flow be directly contained within a chamber formed by a casing provided with means properly adapted to throttle the flow between the inlet and outlet of the measuring mechanism and to thence cause the movement of the unmeasured or inferred volume to exert an inductive effect upon the outlet of the measuring mechanism an inferential proportional water-meter may be thus produced capable of recording accurately within a wide range of rate of discharge. I particularly prefer for this purpose a measuring mechanism of the oscillating-disk type, arranged approximately as here shown, in which the disk-chamber or measuring-casing B, containing the disk 8, is mounted upon seats 9 10 of the lower section P of the main casing in such manner that the inlet-port H of the measuring-casing will lie within the receiving-chamber C, formed by the main casings. The usual connection S to the register is indicated in dotted lines. The discharge from the outlet-chamber 11 of the measuring-casing is to the port 12, and thence, as shown by arrow 13, to the small outlet-tube 14, which discharge constitutes the measured aliquot part of the entire volume. The discharge from the unmeasured or inferred volume of receiving-chamber C is entirely through the space formed by the wall of the outlet-port 12 and lower portion of the main casing, and thence through the converging nozzle 15, as shown by arrows 16. The converging end of the nozzle is to lie approximately flush with the end of the tube, the longitudinal centers of both coinciding. The diameter of the restricted end of the nozzle is to be such as to reduce the area of discharge at this section to such an extent less than that of the area of the supply pipe as to somewhat throttle but not seriously retard the proper maximum delivery of the pipe. The immediate effect of this retarding-nozzle is twofold—namely, first to produce a difference of pressure in all parts of the receiving-chamber C back of the inlet-line 17 of the nozzle and that of the outlet-chamber D; second, to produce induction upon the end of the discharging-tube due to the merging of a portion of the pressure in chamber C into velocity at the discharge of the converging nozzle. The consequence of this is that whatever difference of pressure is thus produced between ports H and 12 at any rate of flow is a practical constant in its relation plus at H and minus at 12, and such force due to this arrangement is realized without practical diminution in its fullest measure up to the instant of immediate delivery of the water to and discharge from the said ports, whence it follows that the single disturbing element in the coefficient of friction which may interfere with the proper registration of the entire quantity is alone in the transit of the measured volume through the measuring-chamber; but the fact is that except at low rate of flow the nozzle may be restricted to such an extent, (and that, too, without interfering with an ordinarily-satisfactory delivery of the meter,) that the difference in pressure between ports H and 12 may amount to several pounds to the square inch, sufficient not only to operate the measuring mechanism properly but even to wreck it should a foreign substance be introduced.

Under the circumstances and arrangements analogous to those herein set forth the frictional conditions, hydraulic and mechanical, as between the nozzle and the measuring-chamber may relatively be regarded as moderate and rapid rates of flow and as practically constant, which fact I have repeatedly demonstrated in practice.

It remains to be said that this device may readily be made to indicate at even the lowest rates of flow, and means for accomplishing this is shown in the modifications shown in Figs. 3 and 4 of the drawings. In this arrangement the nozzle is made with a plurality of spring tongues or reeds 18, adapted to entirely separate, as by a diaphragm, the receiving-chamber C from D by folding down upon the end of the outlet-tube. In this wise the entire quantity would be forced to pass through the measuring-chamber at very low rates of flow, hence causing over-indication; but as the flow increases the tongues will be carried outward, as indicated by the dotted lines, until the proper proportional rate is established. Means for limiting the throw of the reeds, as by the stop-bars 19, (shown in dotted lines,) may also be employed, whereby the tongues, when fully distended, would simulate the condition of the fixed nozzle. In the use of a yielding nozzle the divergence need not be as great as in the case of a fixed nozzle for the reason that additional area is afforded past the sides of the tongues, as at 20.

To establish a proper relation between the measuring mechanism and the inferred quantity to the end that the said mechanism shall not be overworked at maximum flows, I have found the best results from restricting the outlet-tube by a conical nozzle therein, as shown in dotted lines at 21, Fig. 1. This offers but slight resistance at low flows, but is entirely efficient at the higher rates of discharge.

Without limiting myself to the precise construction here shown, I claim—

1. A proportional water-meter comprising a separate measuring-casing B, contained within a receiving-chamber C, an outlet-tube connected to the discharge from the measuring-casing, and a restricted converging nozzle arranged to encompass the outlet-tube and adapted to produce pressure upon the inlet and induction upon the outlet of the measuring mechanism contained within the said casing B, substantially as specified.

2. The combination of the measuring-casing B, the receiving-chamber C, the tube connected to the discharge from the measuring-casing, and the restricted converging nozzle disposed in the path of the inferred volume, whereby to produce pressure upon the inlet and suction upon the outlet of said measuring-casing, substantially as specified.

3. The combination of the measuring-casing B, the receiving-chamber C, the tube connected to the discharge from the measuring-casing, and the restricted converging nozzle having a plurality of spring-tongues disposed in the path of the inferred volume, whereby to produce pressure upon the inlet and suction upon the outlet of said measuring-casing, substantially as described.

4. The combination of the measuring-casing B, the receiving-chamber C, the tube connected to the discharge from the measuring-casing, the restricted converging nozzle having a plurality of spring-tongues disposed in the path of the unmeasured volume, and the fixed stops to limit the deflection of the aforesaid tongues, substantially as described.

In testimony whereof I have signed my name to this specification in the presence of two subscribing witnesses.

JOHN THOMSON.

Witnesses:
F. A. LORECRAFT,
JOS. W. KAY.